(12) United States Patent
Coulombe et al.

(10) Patent No.: US 7,213,072 B2
(45) Date of Patent: May 1, 2007

(54) METHOD AND APPARATUS FOR TRANSCODING CONTENT WITH PERMISSIBLE OPERATIONS AUTHORIZED BY CONTENT CREATOR

(75) Inventors: Stephane Coulombe, Irving, TX (US); Guido Grassel, Espoo (FI)

(73) Assignee: Nokia Mobile Phones, Espoo (FI)

( * ) Notice: Subject to any disclaimer, the term of this patent is extended or adjusted under 35 U.S.C. 154(b) by 790 days.

(21) Appl. No.: 09/851,527

(22) Filed: May 8, 2001

(65) Prior Publication Data

US 2002/0169823 A1   Nov. 14, 2002

(51) Int. Cl.
*G06F 15/13* (2006.01)
(52) U.S. Cl. .................. 709/229; 709/248; 713/200
(58) Field of Classification Search .............. 709/229, 709/248; 713/200
See application file for complete search history.

(56) References Cited

U.S. PATENT DOCUMENTS

| | | | |
|---|---|---|---|
| 6,141,693 A | 10/2000 | Perlman et al. | |
| 6,304,904 B1 | 10/2001 | Sathyanarayan et al. | |
| 6,407,680 B1 | 6/2002 | Lai et al. | |
| 6,421,733 B1 | 7/2002 | Tso et al. | |
| 6,480,902 B1 * | 11/2002 | Yuang et al. | 709/248 |
| 6,480,961 B2 * | 11/2002 | Rajasekharan et al. | 713/200 |
| 6,560,651 B2 * | 5/2003 | Katz et al. | 709/229 |

FOREIGN PATENT DOCUMENTS

| | | |
|---|---|---|
| WO | 9843177 | 10/1998 |
| WO | 00/03525 A | 1/2000 |

OTHER PUBLICATIONS

"Server-directed transcoding", J. C. Mogul, Computer Communications, Elsevier Science Publishers BV, Amsterdam, NL, vol. 24, No. 2, pp. 155-162.
"CC/PP Attribute Vocabularies", W3C, Jul. 21, 2000, paragraphs 01.2, 02.2.

* cited by examiner

Primary Examiner—Nathan J. Flynn
Assistant Examiner—Jinsong Hu (57) ABSTRACT

A method and apparatus is provided for transcoding content communicated in a network. The method features the step of transcoding the content based on permissible transcoding operations authorized by a content creator. The permissible transcoding operations include any transformation, alteration or manipulation of the content. The permissible transcoding operations include: a resolution reduction for reducing a resulting resolution of the content; an aspect ratio modification for specifying a maximum deformation that can be applied to the content when modifying its resolution; a color and bits per pixel modification for specifying if an image can be converted to gray scale or not, and minimum bits per pixel (bpp) or number of colors (or levels) that can be used; cropping for specifying a region of an original picture that must be preserved; and a quality reduction for allowing the content to be further modified by adding some distortions to an image. The content may be images, graphics, video or audio.

25 Claims, 10 Drawing Sheets

(Resolution Reduction Module)

Figure 3:

(Aspect Ratio Modification Module)

Figure 4:

(Color and Bit per Pixel Modification Module)

Figure 5:
(Cropping Module)

Figure 6:
(Quality Reduction Module)

Figure 7:
(Sequence of Permissible Transcoding Operations)

METHOD AND APPARATUS FOR TRANSCODING CONTENT WITH PERMISSIBLE OPERATIONS AUTHORIZED BY CONTENT CREATOR

BACKGROUND OF THE INVENTION

1. Field of Invention

The present invention relates to information browsing, pervasive computing and telecommunications of messaging and multimedia content delivery of a content creator.

2. Description of Related Art

In general, information content is communicated on many different types of networks. (Content is created and/or provided by a content creator or author, which are used herein interchangeably.) Content provided in a certain form on one type of support terminal may be presented in a different form on another type of support terminal. For example, content provided on a large personal computer monitor or display of a desk top computer may have to be provided in a different form (different format, resolution of image, amount of data associated with the content, etc.) on a much smaller liquid crystal diode display of a mobile terminal such as a mobile phone. In order to support terminals with very different characteristics and capabilities (e.g. audio and visual), the content has to be transcoded from one form into another form. In effect, the intrinsic characteristic of the content may have to be changed to better suit the characteristics of a client terminal receiving the content and the capabilities of the network used for transmission of the content. There are two main transcoding approaches used in the prior art—either blind transcoding or content selection.

The first approach uses on-the-fly transcoding. This approach transforms existing content, namely images, to fit specific terminal characteristics by performing scaling, format conversion and color depth reduction, etc. However, since the transformations are blindly (i.e. by universal arbitrary policies) applied to the content (i.e. by arbitrary policies independent of author control), they are not guaranteed to provide acceptable results. For instance, the images may be scaled down to a point where they are unusable (e.g., important text may be unreadable, faces unrecognizable, objects too small to be visible). It may also be inappropriate to transform some color images to gray scale. Finally, content creators want to have control over the content that is distributed and don't want such "out of their control" alteration of the content to occur. For instance, the logo of a company may be altered in a manner that would not be acceptable to the company.

Alternatively, there exists another approach to overcome the problems associated with such blind manipulation. The second approach is based on the selection of content (smart content selection) for which multiple versions of content are created. The versions represent the same information (e.g., a photo) at different resolution, color depth, etc. A selection process chooses, based on the specific characteristics of each terminal, the most appropriate version to deliver. This provides full control to the content creators over the delivered content. However, storing a high number of versions requires a lot of storage space. On the other side, if not enough versions are created then the granularity of the content may not be small enough. For instance, suppose that an image should occupy the whole screen. Then if versions at resolutions of 64×64, 128×128 and 256×256 are created, they would not be optimal for a terminal supporting 100× 100 without scrolling (since the 64×64 version may be selected and occupy only a small part of the screen).

In particular, WO 98/43177 discloses a system for dynamically transcoding data transmitted between computers. The system includes a network environment having a remote transcoding server arranged between a network client and the internet. The remote transcoding server has a transcoder with transcode service providers that transcode content based on predetermined selection criteria, such as content provider preferences, including: (1) the degree of alteration desired for its content, (2) the prioritization for download and display of different content types, (3) cache restriction or prioritization parameters such as update frequency or replacement preferences, (4) the types of users to target, (5) rules or programs to run for customizing content (for example, news or advertising, custom language translation software) based on user or client characteristics, (6) desire for receiving certain types of user or group data collected (for example, demographics or access patterns), and (7) the type of payment/reward offered in exchange for such information. The degree of alteration desired for its content gives content providers the capability to override any potentially content-altering service—for example, by using a pass-through technique triggered by a special tag embedded within the content. The network client may also have transcode service providers to transcode content before it is rendered to a user or to perform a counterpart transcoding function performed by a corresponding transcode service provider of the transcoding server. The subject matter of WO 98/43177, as well as any applications it claims benefit to, are incorporated by reference herein.

SUMMARY OF INVENTION

In general, the present invention provides a method and apparatus that transcodes content based on permissible transcoding operations authorized by the content creator. The term "transcoding" is intended to include any transformation, alteration or manipulation of the content. The content of interest here is primarily images (although it can be applied and extended to video and other content either visual or not). The term "permissible transcoding operations" is intended to include operations that the content creator agrees to be acceptable to be applied to the content. In specifying those operations, the content creator also specifies the limits of those acceptable operations. For instance, the content creator may permit cropping the image content outside a specified region (usually rectangle), or scaling down the image content up to a given factor, etc.

The content may be images, graphics, video or audio, and may be transcoded based on the permissible operations when communicated in a network such as a wireless network, or on any other suitable media such as a digital video disk (DVD) or compact disk (CD). The content may include many versions of the same information element (e.g. same image at different resolutions) and the permissible transcoding operations are provided globally for all versions or individually for each. In such a case, a selection process for the appropriate version would be performed prior to performing the transcoding on the selected version.

The permissible transcoding operations may include the following: (1) a resolution reduction module for reducing the resolution of the content; (2) an aspect ratio modification module for specifying a maximum deformation that can be applied to the content when modifying its resolution; (3) a color and bits per pixel modification module for specifying if an image can be converted to gray scale or not, and minimum bits per pixel or number of colors or levels that can be used; (4) cropping module for specifying a rectangular area of an original picture that must be preserved; and (5) a quality reduction module for allowing the content to be further modified by adding some distortions to an image.

A sequence of the aforementioned permissible transcoding operations would be cropping, a resolution reduction and aspect ratio modification, a color and bits per pixel modification and a quality reduction.

The steps of the method may be performed in whole or in part in a creator terminal, a content provider, a proxy/gateway, a client terminal (also known as a user terminal), or a combination thereof.

The apparatus includes various modules implemented in hardware, software, or a combination thereof for performing the aforementioned steps.

The present invention overcomes the problem of having to apply arbitrary (blind) transcoding policies, as well as the lack of control that the content creator or provider has when blind transcoding is used. It also overcomes the problem of having to generate a high number of versions; only a few reference versions are needed and the gap between them is filled by those transcoding operations. The invention also ensures a controlled use of some content and reduces the amount of space needed for different versions of the content. The basic idea of the invention is the possibility for the content creator to provide permissible transcoding operations for the content.

In effect, the invention provides a solution that combines the benefits of both of the aforementioned methods.

DETAILED DESCRIPTION OF INVENTION

Figure 1:
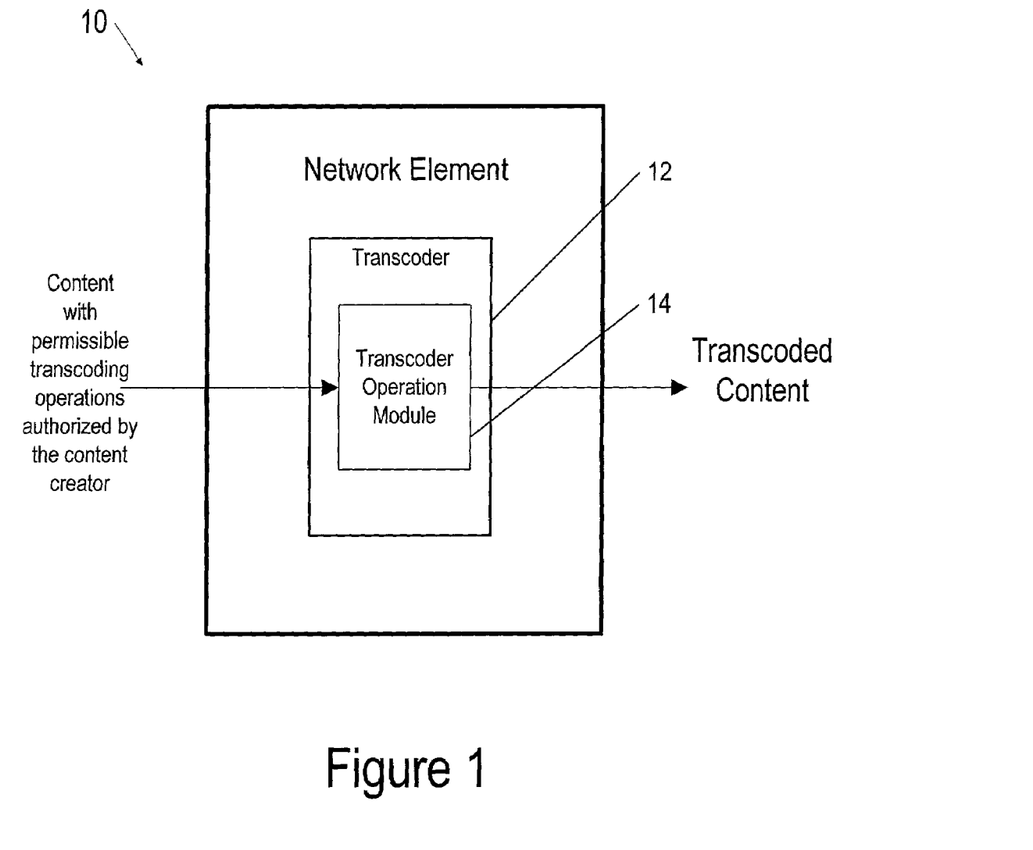
FIG. 1 is a block diagram of a network element 10 that is the subject matter of the present invention.

FIG. 1: The Basic Invention

FIG. 1 shows a network element generally indicated as 10 having a transcoder 12 with a transcoder operation module 14 for transcoding content of a content creator. In operation, the transcoder operation module 14 transcodes the content based on permissible transcoding operations authorized by the content creator and provides transcoded content.

The network element 10 may be in the form of a creator terminal, a content provider, a proxy/gateway or a client terminal, which form networks discussed below in relation to FIGS. 1A, 1B, . . . , 1F. The scope of the network is not intended to be limited to the network element 10 being implemented as any particular device.

The transcoded content is a transformed, altered or manipulated version of the original content. The scope of the invention is not intended to be limited to any particular transformation, alteration or manipulation version of the original content, or in which device the content is transcoded, as long as the transcoding operation(s) is authorized or permitted by the content creator. The scope of the invention is also not intended to be limited to any particular recipient of the transcoded content or the manner in which it is provided to the recipient.

Figure 1A:
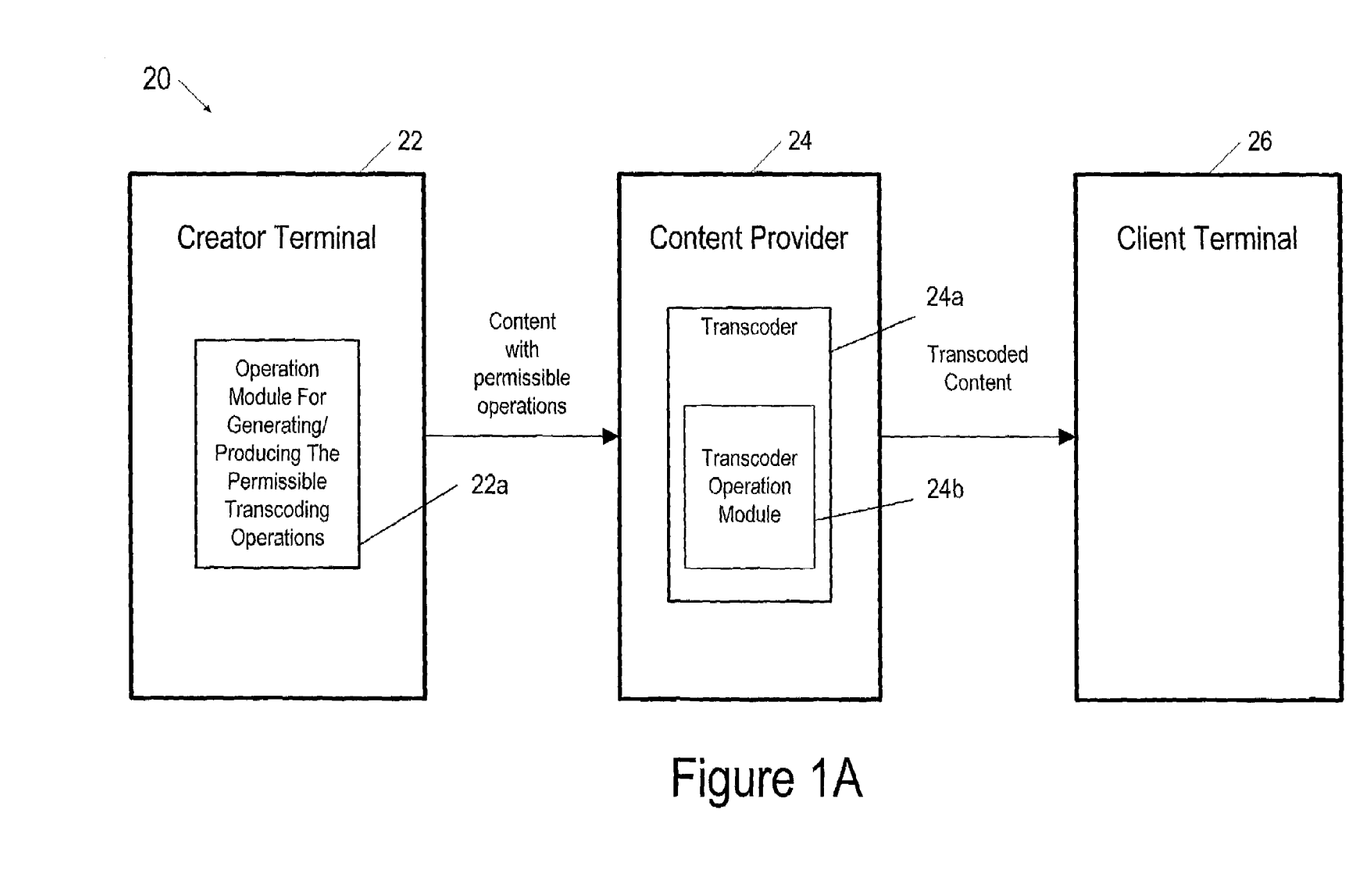
FIG. 1A is a block diagram of a network configuration 20 that is the subject matter of the present invention.

FIG. 1A

FIG. 1A shows a network configuration generally indicated as 20 having three network elements 22, 24, 26. As shown, a content creator terminal 22 (that could be a user, author, etc.) creates content and sends it to a content provider 24 that transcodes the content based on permissible operations (and possibly terminal characteristics) before sending to a client terminal 26.

The content creator terminal 22 is shown having an operation module 22a for generating/producing the permissible transcoding operations. The scope of the invention is not limited to which network element performs the transcoding, and the content creator terminal 22 is shown having the capabilities to perform one or more of the permissible transcoder operations.

In operation, the content provider 24 has a transcoder 24a with a transcoder operation module 24b for performing one or more of the permissible transcoder operations. In the network configuration 20, the content provider 24 receives content with permissible operations from the content creator terminal 22, and provides transcoded content to the client terminal 26.

Figure 1B:
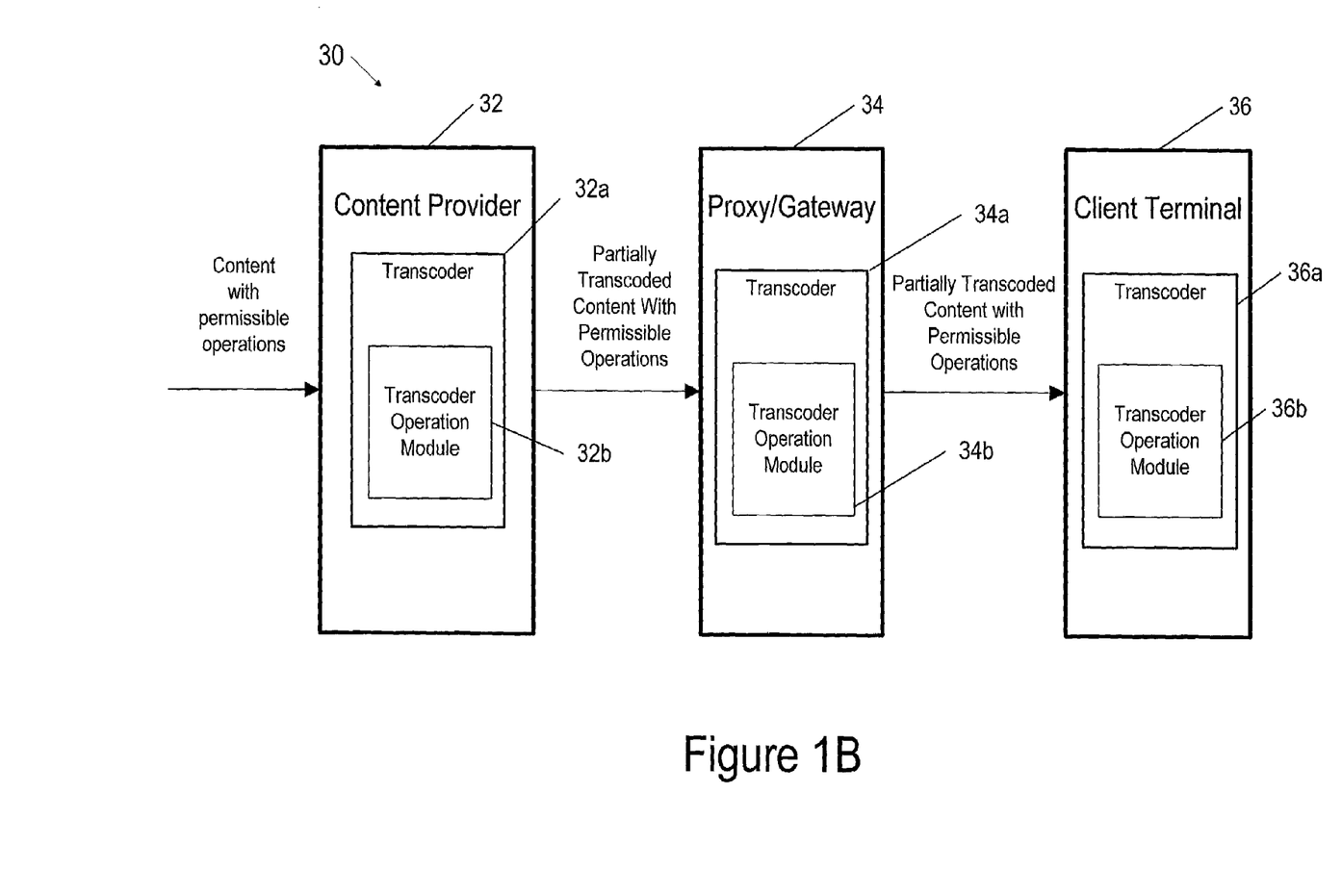
FIG. 1B is a block diagram of a network configuration 30 that is the subject matter of the present invention.

FIG. 1B

FIG. 1B shows a network configuration generally indicated as 30 having three network elements 32, 34, 36. In FIG. 1B, the content previously created (using some content creating tools), and containing permissible transcoding operations, is partially transcoded by a content provider/distributor 32, a proxy/gateway 34 and a client terminal 36 based on permissible operations (and possibly terminal characteristics).

In operation, the content provider 32 has a transcoder 32a with a transcoder operations module 32b for performing one or more of the permissible transcoder operations. The content provider 32 receives content with permissible operations, and provides partially transcoded content to the proxy/gateway 34. The proxy/gateway 34 has a transcoder 34a with a transcoder operations module 34b for performing one or more of the permissible transcoder operations. The proxy/gateway 34 receives the partially transcoded content with permissible operations, and provides partially transcoded content to the client terminal 36. The client terminal 36 has a transcoder 36a with a transcoder operations module 36b for performing one or more of the permissible transcoder operations after receiving the partially transcoded content with permissible operations from the proxy/gateway. In this network configuration 30, the scope of the invention is not intended to be limited to where the content originated or how the content was created.

Figure 1C:
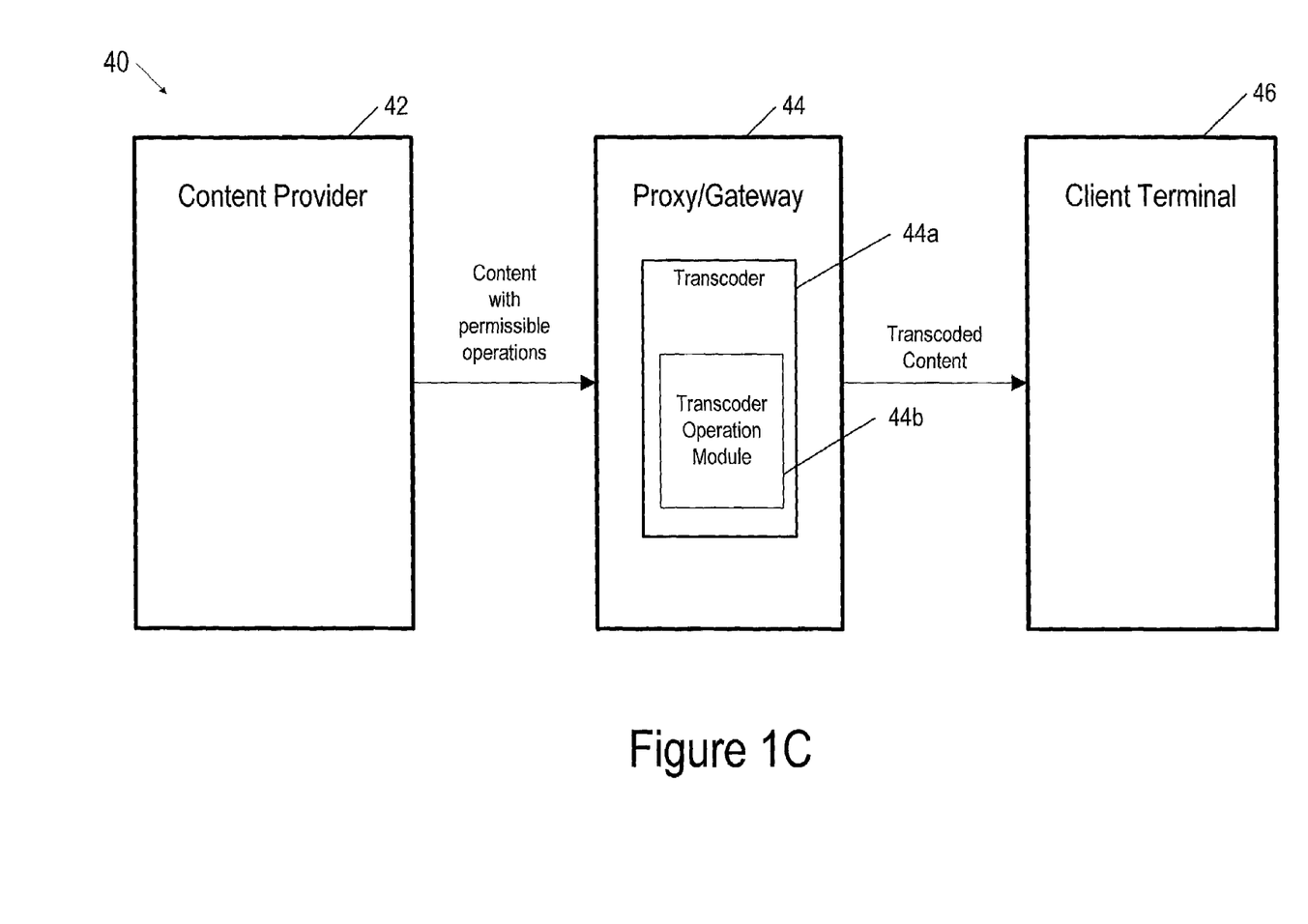
FIG. 1C is a block diagram of a network configuration 40 that is the subject matter of the present invention.

FIG. 1C

FIG. 1C shows a network configuration generally indicated as 40 having three network elements 42, 44, 46. In FIG. 1C, the content previously created (using some content creating tools) is transcoded by a proxy/gateway 44 based on permissible operations (and possible terminal characteristics).

In operation, a content provider 42 provides content with permissible operations to the proxy/gateway 44 having a transcoder 44a with a transcoder operation module 44b that transcodes the content based on the permissible operations, and provides transcoded content to a client terminal 46.

Figure 1D:
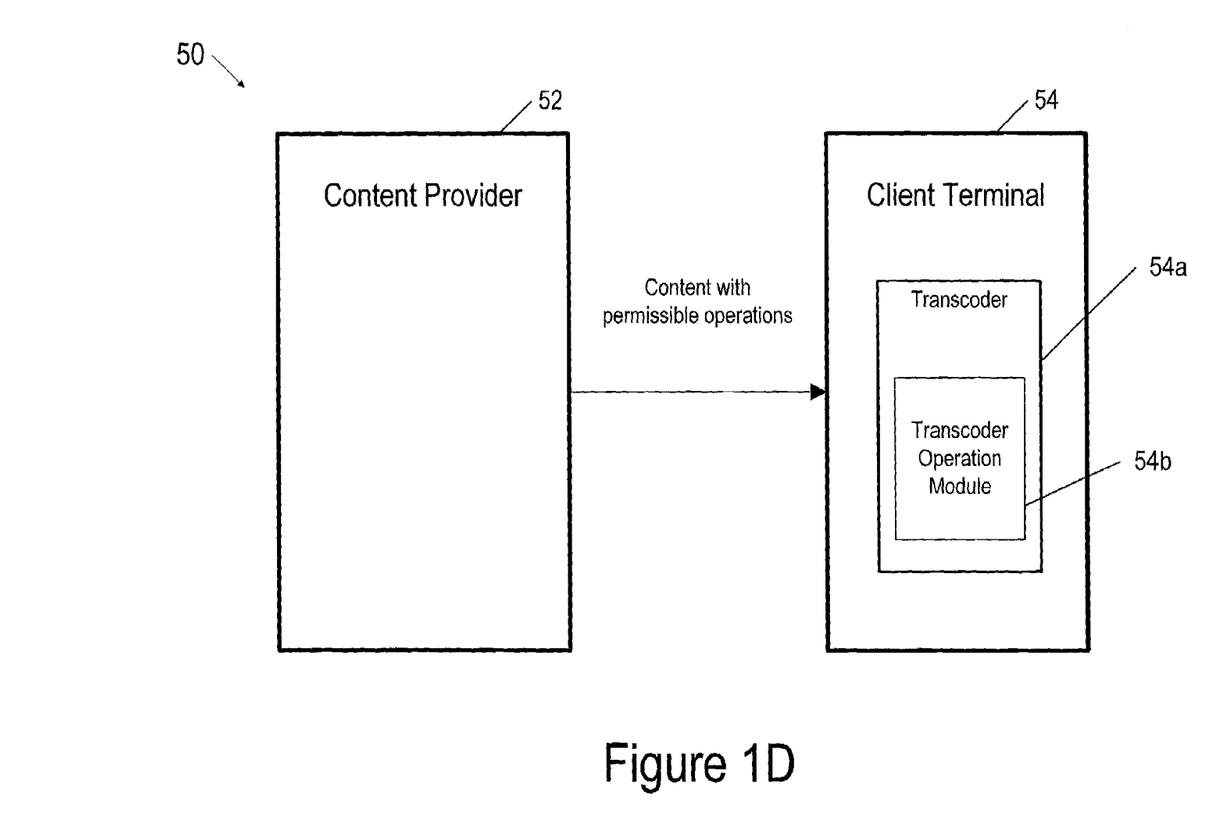
FIG. 1D is a block diagram of a network configuration 50 that is the subject matter of the present invention.

FIG. 1D

FIG. 1D shows a network configuration generally indicated as 50 having two network elements 52, 54. In FIG. 1D, the content previously created (using some content creating tools) is transcoded on a client terminal 54 based on permissible operations (and probably terminal characteristics).

In operation, a content provider 52 provides content with permissible operations to the client terminal 54 having a transcoder 54a with a transcoder operation module 54b that transcodes the content based on the permissible operations.

Figure 1E:
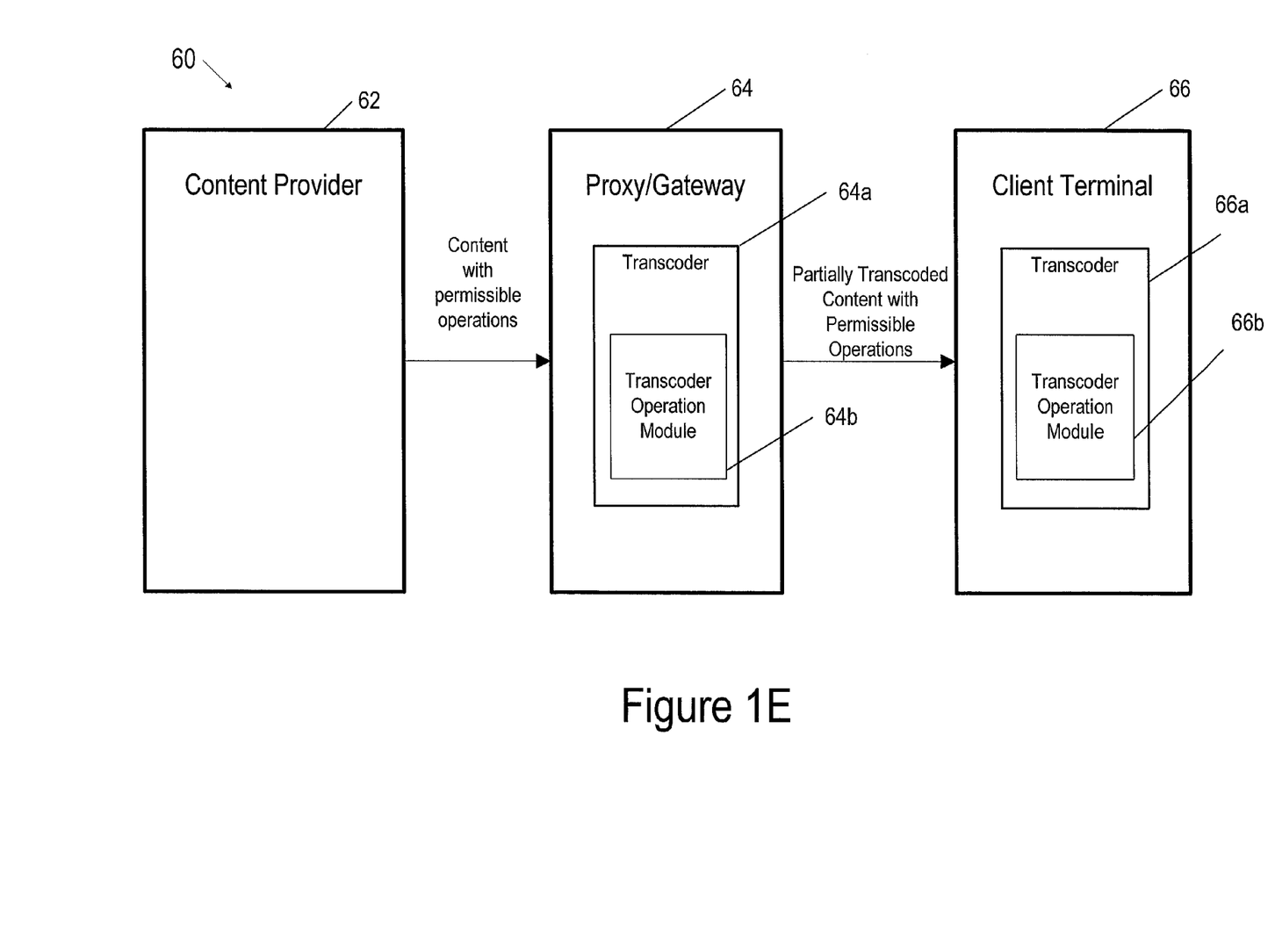
FIG. 1E is a block diagram of a network configuration 60 that is the subject matter of the present invention.

FIG. 1E

FIG. 1E shows a network configuration generally indicated as 60 having three network elements 62, 64, 66. In FIG. 1E, the content previously created (using some content tools) is transcoded by a proxy/gateway 64 partially and also on a client terminal 66 based on permissible operations (and possibly terminal characteristics).

In operation, a content provider 62 provides content with permissible operations to the proxy/gateway 64 having a transcoder 64a with a transcoder operation module 64b that partially transcodes the content based on the permissible operations, and provides partially transcoded content with permissible operations to the client terminal 66. The client terminal 66 also has a transcoder 66a with a transcoder operation module 66b that completes the transcoding of the content based on the permissible operations.

Figure 1F:
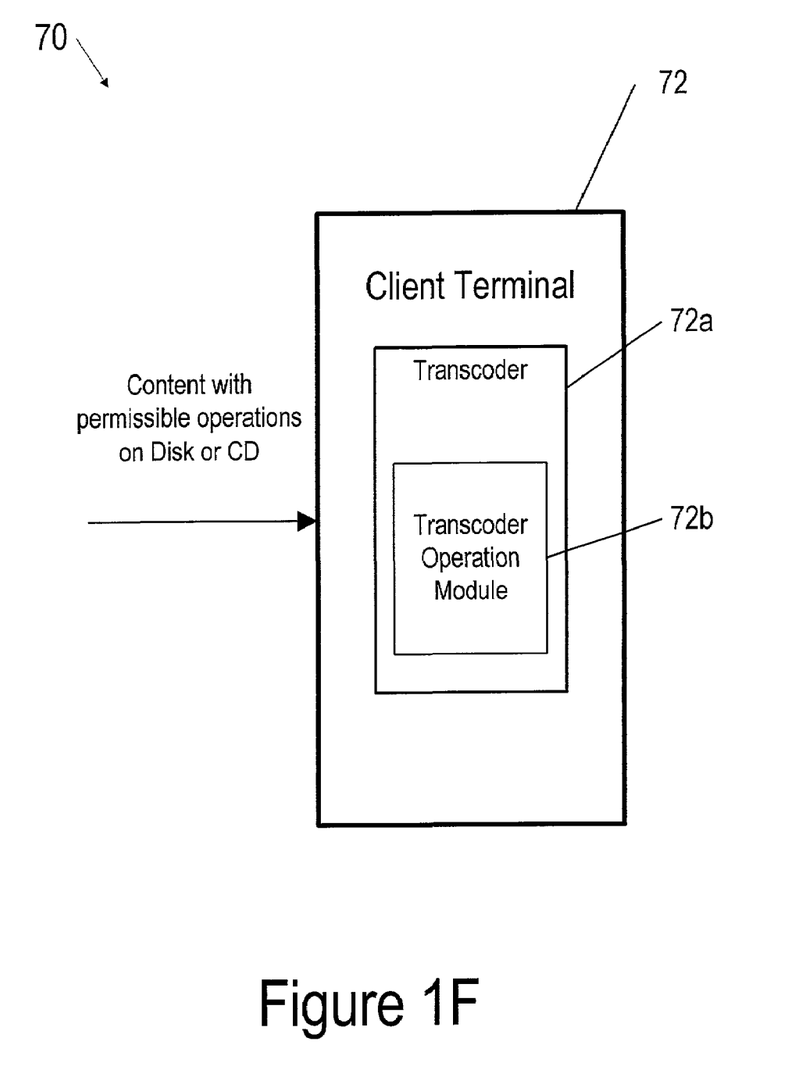
FIG. 1F is a block diagram of a network configuration 70 that is the subject matter of the present invention.

FIG. 1F

FIG. 1F shows a network configuration generally indicated as 70 having a single network element 72. In FIG. 1F, the content stored on a storage medium, such a digital video disk (DVD) or a compact disk (CD), memory card or from an expansion module is transcoded by a client terminal 72 based on permissible operations (and possibly terminal characteristics).

In operation, the client terminal 72 receives a DVD, CD, memory card or expansion module having content with permissible operations and has a transcoder 72a with a transcoder operation module 72b that transcodes the content based on the permissible operations. The scope of the invention is not intended to be limited to only these types of media.

Permissible Transcoding Operations

The following provides a description of the permissible transcoding operations that may be applied to image content in the process of adapting it to different terminals. Also described is a way in which the author may provide limits regarding those transcoding operations.

Resolution Reduction (or Re-sizing) Module 200

Figure 2:
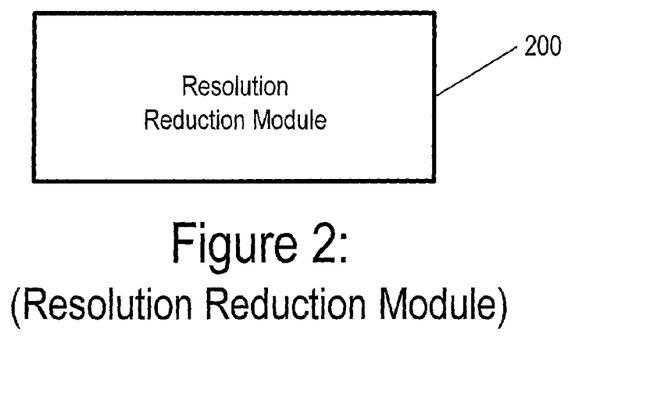
FIG. 2 is a diagram of a resolution reduction module that is a part of a transcoder operation module shown in FIG. 1.

FIG. 2 shows a resolution reduction module 200 for reducing the resolution of the content (increasing resolution is typically assumed to always be acceptable since it can be performed without loss of information).

The resolution reduction may include reducing the content by a maximum decimation factor or ratio or a minimum resolution in pixels. The author can provide the limits in two ways: first, by providing a maximum decimation factor or ratio (e.g. a maximum reduction by, for example, 2 or 1.5, etc.); and second, by providing the minimum resolution, in pixels, which the final image should have (e.g. 64×56). Typically, proper filtering prior to decimation is performed and assumed.

The scope of the invention is not intended to be limited to any particular resolution reduction, or the manner in which it is implemented.

Aspect Ratio Modification Module 300

Figure 3:
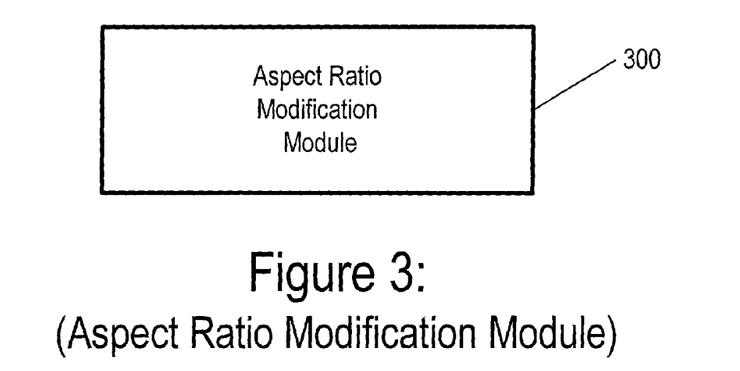
FIG. 3 is a diagram of an aspect ratio modification module that is a part of a transcoder operation module shown in FIG. 1.

FIG. 3 shows an aspect ratio modification module 300 for specifying a maximum deformation ("stretching") that can be applied to image content when modifying its resolution.

By way of example, aspect ratio modification may include converting a 1200×800 image to 800×600, which does not preserve exactly the same aspect ratio but may be acceptable. The author would provide a range of ratios that are acceptable. If the parameters x, y are the resolution of the original image, then the author would provide a minimum ratio (MinRatio) and a maximum ratio (MaxRatio) such that the resulting image size (x', y') would satisfy the equation:

$$MinRatio <= (y'/x')/(y/x) <= MaxRatio.$$

Note that typically one would normalize with respect to the original aspect ratio so that one measures the deformation with respect to the original image and thus values with respect to percentage are easier to provide (e.g. for 10% deformation, one would have a MinRatio=0.9 and a MaxRatio=1.1).

The scope of the invention is not intended to be limited to any particular aspect ratio modification, or the manner in which it is implemented.

Color and Bits per Pixel Modification Module 400

Figure 4:
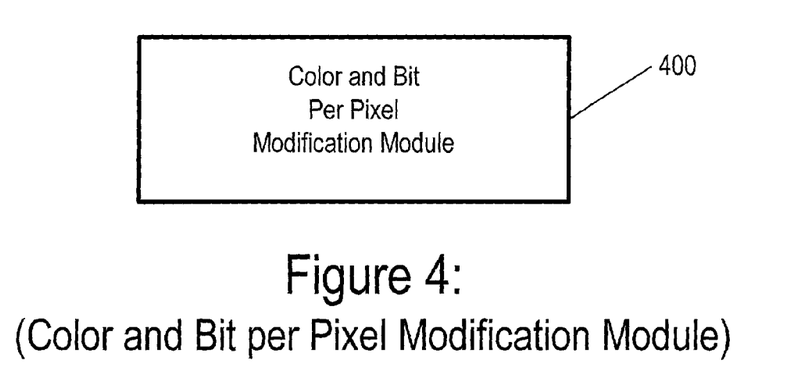
FIG. 4 is a diagram of a color and bits per pixel modification module that is a part of a transcoder operation module shown in FIG. 1.

FIG. 4 shows a color and bits per pixel modification module 400 for specifying if image content can be converted to a gray scale or not, and minimum bits per pixel (bpp) or number of colors (or levels) that can be used.

The color and bits per pixel modification may specify a list of possible modes such as: "color 16 bpp", "256 colors", "gray scale 8 bpp". To achieve the reduced number of colors or color depth (bpp), standard color reduction methods are assumed.

The scope of the invention is not intended to be limited to any particular color and bits per pixel modification, or the manner in which it is implemented.

Cropping Module 500

Figure 5:
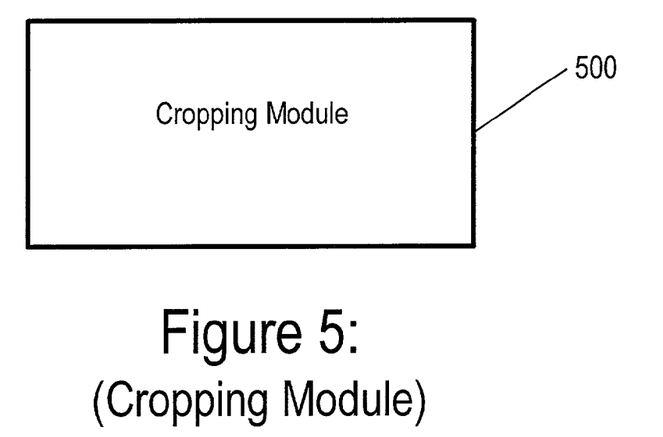
FIG. 5 is a diagram of a cropping module that is a part of a transcoder operation module shown in FIG. 1.

FIG. 5 shows a cropping module 500 for specifying a rectangular area of the original picture that must be preserved.

The cropping may include any part of the original picture outside the rectangular area being removed. The interior area constitutes the region of interest. It is important to track the corresponding location of this rectangular area in the image if it is modified by scaling and aspect ratio prior to cropping. However, for computational efficiency, it would be expected that cropping be performed prior to those operations.

The scope of the invention is not intended to be limited to any particular cropping technique, shape of the region of cropping, or the manner in which it is implemented.

Quality Reduction Module 600

Figure 6:
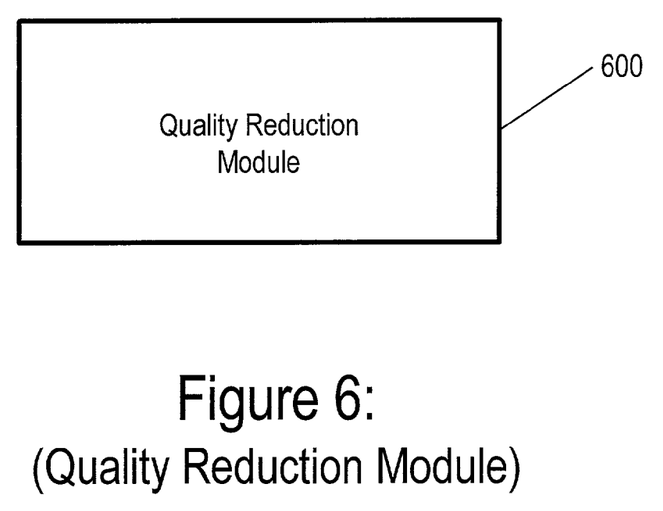
FIG. 6 is a diagram of a quality reduction module that is a part of a transcoder operation module shown in FIG. 1.

FIG. 6 shows a quality reduction module 600 for allowing the content to be further modified by adding some distortions to an image.

The quality reduction may be required to achieve higher compression performance such as in the case of Joint Photographic Experts Group (JPEG) encoding. A way to specify the permissible distortion that can be applied to the image is by the "peak signal-to-noise ratio (PSNR)"; a commonly used distortion measure in image processing. The peak SNR is measured between the image before the module leading to distortion and right after. When an encoder is involved, the effect of the associated decoding must be taken into account to measure the overall distortion. Note that effect of scaling, aspect ratio, cropping and bpp reduction would not typically be taken into account in this case.

The scope of the invention is not intended to be limited to any particular quality reduction technique, error measure, or the manner in which it is implemented.

Sequence of Permissible Image Transcoding Operations

Figure 7:
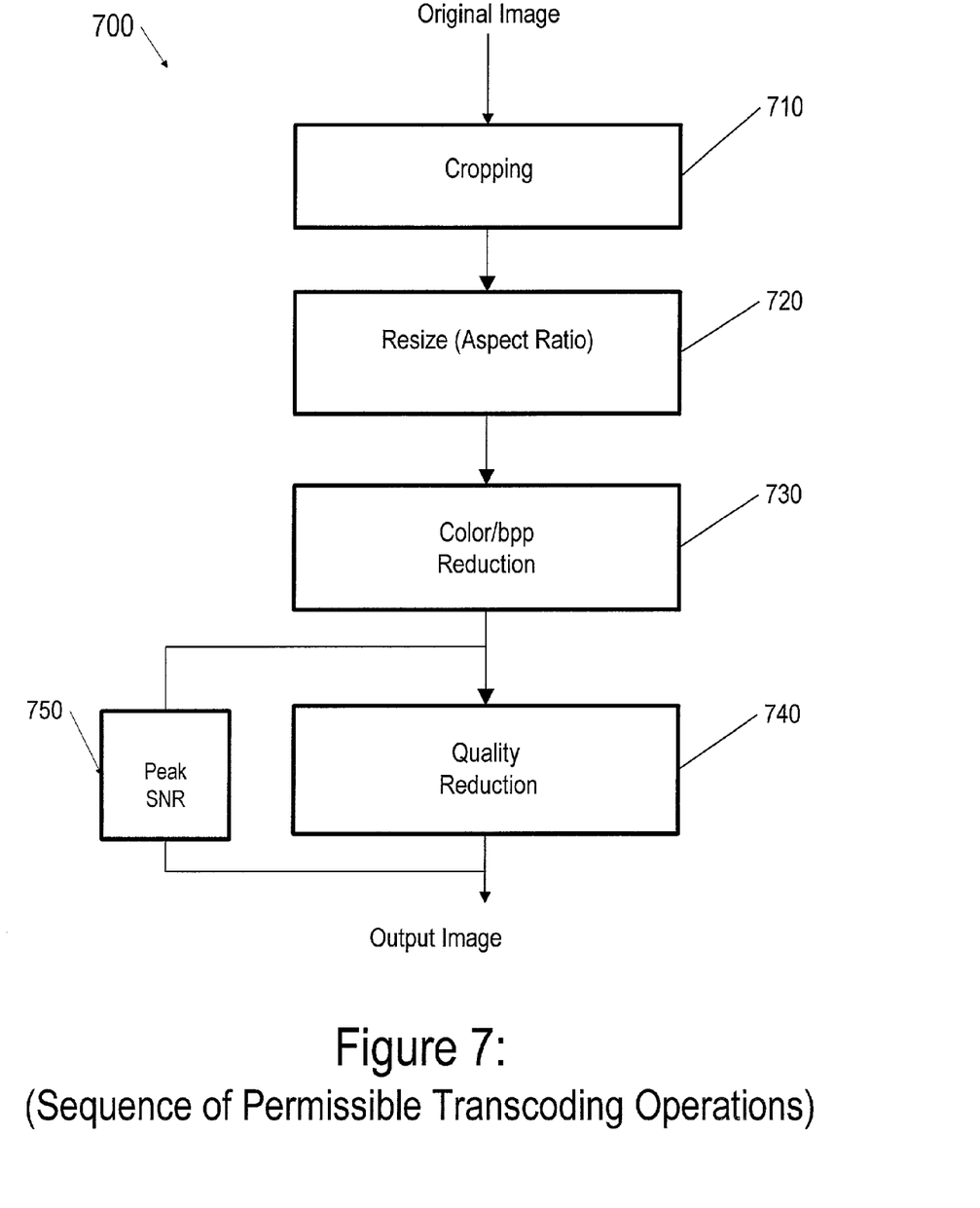
FIG. 7 is a sequence of permissible image transcoding operations.

FIG. 7 shows a sequence 700 of permissible operations or steps on image content, including the cropping step 710, the aspect ratio modification step 720, the color and bits per pixel modification step 730 and the quality reduction step 740. The order for the operations is set for specific reasons. For instance, re-sizing (because of the involved filtering and decimation process) should be performed on the best color precision representation of the content (not after color and bpp reduction). Also, it may have an effect of the set of chosen color palette and must be performed before. For that same reason (proper selection of colors), cropping must be performed prior to color and bpp reduction. In order to save computations, cropping should be performed first (before re-sizing). The quality reduction should be performed last since it involves usually the final encoding of the image in some specific format.

As shown, the sequence also includes a peak SNR step 750 where error may be measured. If the quality of the quality reduction module 740 is such that its operation will provide a result within an acceptable peak-signal-to-noise (PSNR) range, then the PSNR comparison module 750 is not needed. The PSNR comparison module 750 may also be embedded in the quality reduction module 740 to validate and guide its operation.

The scope of the invention is not intended to be limited to any particular permissible transcoding operation. Embodiments of the invention are envisioned using other permissible transcoding operations in other sequences.

Variation on the Basic Invention

First, the content creator provides from a list of transcoding operations those that are permissible and their parameters. Operations that are not specified are assumed not to be permissible. The list of operations and ways to specify the parameters may grow and change. However the main idea is to provide adaptation and/or transcoding instructions.

Second, although transcoding operations discussed above are specified on image content, permissible transcoding operations can also be specified for other types of content such as graphics, video, audio, etc. In such case, a set of appropriate instructions must be set (e.g. in audio the minimum sampling rate, minimum output sample precision in bits, minimum perceptual-domain SNR, etc.). However, the whole thrust of the invention is to provide permissible transcoding operations for all types of content on all types of media.

Third, the permissible transcoding operations meta-data can be represented and delivered in many forms. It can be in the form of content annotation meta-data, as in Moving Pictures Expert Group MPEG-7, and in the form of a special MIME-type in mail/message attachments, etc. The scope of the invention is not intended to be limited to the particular data form of the content or the permissible operations.

Fourth, the adaptation can be performed at the content provider, in a proxy/gateway, in the client terminal or a combination thereof (as the content is modified, so the permissible operations should be adjusted accordingly). The device could, for instance, crop the image, which would provide a better view of the content on a small display. The aspect ratio information would help to keep visual content realistic if the resolution changes. The transcoding could be done in whole or in part on each network element based on its capability to perform the transcoding operations.

Fifth, the solution is compatible with the multiple content representation solution, as it would extend the granularity of the content around some discrete versions of the content, i.e. instead of creating a high number of versions, the content creator would create a few reference versions and transcoding operations that would fill the gap between them. Combining both solutions is also part of the present invention.

Possible Implementations

There are many different possible implementations of the invention, and the scope of the invention is not intended to be limited to any particular implementation thereof.

For example, the invention may be implemented in the creator terminal providing the content, a client terminal requesting the content, a proxy providing the content or a possible proxy/gateway between the content provider and the client responsible for transcoding the content for the client before delivery. In all cases, the content with its annotation (including transcoding instructions) would be on the server. Below are possible implementation scenarios:

First, the server knows about the characteristics of the client terminal and returns a transcoded version of the content to the client terminal based on the admissible transcoding operations and the terminal capabilities. The scope of the invention is not intended to be limited to any particular algorithm for implementing the transcoding.

Second, the content provider sends the original content to the proxy/gateway with annotation. The proxy/gateway does the adaptation. In that case, an agreed format for annotation must be used between the server and the proxy/gateway.

Note that the content also can be messages. In the case of multimedia messaging, the transcoding could take place in the multimedia message service center (MMSC) acting as the server. The transcoding could also take place in the proxy/gateway located between the MMSC and the user terminal. The transcoding instructions could be part of an attachment (or multiple attachments specific to individual message parts).

The adaptation can be performed also on the client device. It could, for instance, crop which would provide a better view of the content on a small display; the aspect ratio information would help to keep visual content realistic, etc. In that case, an agreed format for annotation must be used between the server and the terminal.

The transcoding can also be performed in a complementary fashion in the proxy server, the proxy/gateway and the client terminal (and any other devices that may be involved in the delivery process).

The format of the annotation can follow RDF, MPEG-7, etc. A person skilled in the art would appreciate how to implement tools to provide and validate such transcoding instructions to ease the creation process.

The client terminal permissible transcoding operation module, transcoder controller module, transcoder operation module, resolution reduction module, aspect ratio modification module, color and bits per pixel modification module, cropping module and quality reduction module each may be implemented using hardware, software or a combination thereof. In a software embodiment, a typical microprocessor-based design may be used. As a person skilled in the art would appreciate, the microprocessor-based design would typically include a more expensive processor, ROM, RAM, input/output and data and address lines for coupling the same. The scope of the invention is not intended to be limited to any particular software implementation of the transcoder operation module, the resolution reduction module, aspect ratio modification module, color and bits per pixel modification module, cropping module and quality reduction module. A person skilled in the art after reading the patent application as a whole would appreciate how to implement any of the aforementioned modules in hardware, software, or a combination thereof.

Advantages

Some important features clearly differentiate the transcoding technique of the invention and other techniques. For example, when using the invention, the scaling between original (on the server) and final (on the terminal) content doesn't follow a fixed rule for specific type of content, such as fitting images to the whole screen or reduction by a constant factor. Also, when using the invention, the granularity of the adaptation is very fine (which shows transcoding is used, not smart content selection alone). When using the invention, the image is sometimes cropped (this is not performed by blind transcoding).

The invention has specific advantages over the prior art blind transcoding technique. For example, when using the invention, the content creator has control over what operations will be performed on the content. He can ensure that the size of a company logo won't be reduced too much or that the colors won't be modified (to gray scale) if he doesn't want to. When using the invention, the content can also be cropped for better results. In blind transcoding scaling is performed; never cropping.

The invention has specific advantages over using the prior art smart content selection technique. For example, when using the invention, the content creator doesn't need to create a huge number of versions to cover all the cropping, re-sizing, quality reduction, color depth reduction. When using the invention, the invention allows very fine granularity.

Other advantages of the invention include the fact that the invention can be used with smart content selection when transcoding operations can't cover the whole range of terminal capabilities.

Other Points of Interest

It is also noted that, as in the case of blind transcoding, with the invention the adaptation requires some processing (CPU). It may also not be easy to find optimally encoding parameters that will ensure that the results are within the prescribed SNR limits. It may be difficult for the user to specify good SNR limits, especially since the other operations may reduce already the quality. The user must generate those transcoding instructions, and will have to experiment to know what is admissible. Some specialized content creator or provider tools for this purpose may be required.

Scope of the Invention

Accordingly, the invention comprises the features of construction, combination of elements, and arrangement of parts which will be exemplified in the construction hereinafter set forth.

It will thus be seen that the objects set forth above, and those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

We claim:

1. A network element comprising:
    a transcoder for transcoding context of a content creator or provider that is presented in a certain form on one type of support, terminal, node or device,
    the transcoder having a transcoder operation module configured for transcoding the content based on one or more permissible transcoding operations authorized by the content creator or provider so as to present the content in a different and acceptable form on another type of support terminal, node or device, and
    the transcoder responding to a signal containing the content and information about the permissible transcoding operations that may be applied on the content permissible by the content creator or provider, applying the permissible transcoding operations on the content and providing a transcoded content signal containing information about a transcoded content.

2. A network element according to claim 1, wherein the network element is a creator terminal, a content provider, a proxy/gateway or a client terminal.

3. A network element according to claim 1, wherein the permissible transcoding operations include any transformation, alteration or manipulation of the content permitted by the content creator or provider.

4. A network element according to claim 1, wherein the permissible transcoding operations include a resolution reduction module configured for reducing the resolution of the content.

5. A network element according to claim 4, wherein the content is reduced by either a maximum decimation factor or ratio or a minimum resolution in pixels.

6. A network element according to claim 1, wherein the permissible transcoding operations include an aspect ratio modification for specifying a maximum deformation that can be applied to the content when modifying its resolution.

7. A network element according to claim 1, wherein the permissible transcoding operations include a color and bits per pixel modification for specifying if an image can be converted to gray scale or not, and minimum bits per pixel or number of colors or levels that can be used.

8. A network element according to claim 1, wherein the permissible transcoding operations include cropping for specifying a region of an original picture that must be preserved.

9. A network element according to claim 1, wherein the permissible transcoding operations include a quality reduction for allowing the content to be further modified by adding some distortions to an image.

10. A network element according to claim 1, wherein a sequence of permissible image transcoding operations for image content includes cropping, an aspect ratio modification, a color and bits per pixel modification and a resolution reduction.

11. A network element according to claim 1, wherein the content includes images, graphics, video or audio.

12. a method comprising:
transcoding content of content creator or provider that is presented in a certain form on one type of support terminal, node or device, based on one or more permissible transcoding operations authorized by the content creator or provider so as to present the content in a different and acceptable form on another type of support terminal, node or device, where the permissible transcoding operations include any transformation, alternation or manipulation of content permitted by the content creator or provider.

13. A method according to claim 12, wherein the method is performed in a creator terminal, a content provider, a proxy/gateway, a client terminal, or a combination thereof.

14. A method according to claim 12, wherein the permissible transcoding operations include a resolution reduction for reducing the resolution of the content.

15. A method according to claim 14, wherein the content is reduced by either a maximum decimation factor or ratio or a minimum resolution in pixels.

16. A method according to claim 12, wherein the permissible transcoding operations include an aspect ratio modification for specifying a maximum deformation that can be applied to the content when modifying its resolution.

17. A method according to claim 12, wherein the permissible transcoding operations include a color and bits per pixel modification for specifying if an image can be converted to gray scale or not, and minimum bits per pixel or number of colors or levels that can be used.

18. A method according to claim 12, wherein the permissible transcoding operations include cropping for specifying a region of an original picture that must be preserved.

19. A method according to claim 12, wherein the permissible transcoding operations include a quality reduction for allowing the content to be further modified by adding some distortions to an image.

20. A method according to claim 12, wherein a sequence of permissible image transcoding operations for image content include cropping, an aspect ratio modification, a color and bits per pixel modification and a resolution reduction.

21. A method according to claim 12, wherein wherein the content includes images, graphics, video or audio.

22. A network comprising:
a network element with a transcoder for transcoding content of a content creator or provider that is presented in a certain form on one type of support terminal, node or device, the transcoder having a transcoder operation module configured for transcoding the content based on permissible transcoding operations authorized by the content creator or provider; and a client terminal having a respective transcoder with a respective transcoder operation module configured for at least partially transcoding the content based on permissible transcoding operations authorized by the content creator or provider.

23. A network according to claim 22, wherein the network includes a creator terminal, a content provider, a proxy/gateway, a client terminal or a combination thereof, one or more of which having a respective transcoder with a respective transcoder operation module configured for transcoding the content based on permissible txanscoding operations authorized by the content creator or provider.

24. A network according to claim 22, wherein the network includes a content provider having a respective transcoder with a respective transcoder operation module configured for at least partially transcoding the content based on permissible transcoding operations authorized by the content creator or provider.

25. A network according to claim 22, wherein the network includes a proxy/gateway having a respective transcoder with a respective transcoder operation module configured for at least partially transcoding the content based on permissible transcoding operations authorized by the content creator or provider.

* * * * *

UNITED STATES PATENT AND TRADEMARK OFFICE
CERTIFICATE OF CORRECTION

| | | |
|---|---|---|
| PATENT NO. | : 7,213,072 B2 | Page 1 of 1 |
| APPLICATION NO. | : 09/851527 | |
| DATED | : May 1, 2007 | |
| INVENTOR(S) | : Stephane Coulombe et al. | |

It is certified that error appears in the above-identified patent and that said Letters Patent is hereby corrected as shown below:

Column 11, line 34, claim 12, line 1, "a" should be --A--
Column 12, line 19, claim 21, line 1, second occurrence of "wherein" should be deleted
Column 12, line 39, claim 23, line 6, "txanscoding" should be --transcoding--

Signed and Sealed this

Twentieth Day of May, 2008

JON W. DUDAS
*Director of the United States Patent and Trademark Office*